(12) United States Patent
Maruwaka et al.

(10) Patent No.: US 6,907,009 B2
(45) Date of Patent: Jun. 14, 2005

(54) RATE MATCHING CALCULATION METHOD AND RATE MATCHING APPARATUS

(75) Inventors: Yasuyo Maruwaka, Yokosuka (JP); Noriaki Minamida, Kanazawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 714 days.

(21) Appl. No.: 09/820,636

(22) Filed: Mar. 30, 2001

(65) Prior Publication Data

US 2001/0046211 A1 Nov. 29, 2001

(30) Foreign Application Priority Data

Mar. 31, 2000 (JP) ........................................ 2000-099510

(51) Int. Cl.[7] .......................... H04J 1/16; H04B 7/216
(52) U.S. Cl. ....................... 370/252; 370/335; 370/342
(58) Field of Search ................................. 375/130, 140, 375/295, 346, 347; 714/701, 704, 774, 770, 790; 370/252, 320, 335, 342, 465

(56) References Cited

U.S. PATENT DOCUMENTS

| | | | |
|---|---|---|---|
| 5,687,095 A | | 11/1997 | Haskell et al. |
| 6,397,367 B1 | | 5/2002 | Park et al. |
| 6,463,097 B1 | * | 10/2002 | Held et al. .................. 375/225 |
| 6,473,442 B1 | * | 10/2002 | Lundsjo et al. ............. 370/537 |
| 6,510,137 B1 | * | 1/2003 | Belaiche ..................... 370/232 |
| 6,545,983 B2 | * | 4/2003 | Belaiche ..................... 370/252 |
| 6,567,466 B1 | * | 5/2003 | Ovalekar et al. ........... 375/225 |
| 6,601,214 B1 | * | 7/2003 | Hammons, Jr. ............. 714/790 |
| 6,621,873 B1 | * | 9/2003 | Kim et al. .................. 375/295 |
| 6,622,281 B1 | * | 9/2003 | Yun et al. ................... 714/790 |

OTHER PUBLICATIONS

3 G TS 25, 212 v3.2.0 (Mar. 2000), Partnership Project: Technical Specification Group Radio Access Network; Multiplexing and channel coding (FDD) (Release 1999), pp. 1–58.

R. Parthasarathi, et al.; "Modified straight division: A computer implementation of multiple-precision division," Microprocessing and Microprograming, Elsevier Science Publishers, BV., Amsterdam, NL, vol. 41, No. 3, Jun. 1, 1995, pp. 193–209, XP004008488, ISSN: 0165–6074.

C. L. Muliss, et al.; "On the Standard Rounding Rule for Multiplication and Division," Chinese Journal of Physics. Jun. 1998, Phys. Soc. Republic of China, Taiwan, vol. 36, No. 3, pp. 479–487, XP002259160, ISSN: 0577–9073.

C. L. Wey; "Design of fast high-radix SRT dividers and their VLSI implementation," IEEE Proceedings E. Computers & Digital Techniques, Institutional of Electrical Engineers, Stevenage, GB, vol. 147, No. 4, Jul. 28, 2000, XP006013922, ISSN: 1350–2387, pp. 275–281.

I. Sohn, et al.; "Performance Studies of Rate Matching for WCDMA Mobile Receiver," VTC 2000– Fall, IEEE VTS 52nd, Vehicular Technology Conference, Boston, MA, Sep. 24–28, 2000, IEEE Vehicular Technology Conference, New York, NY: IEEE, US, vol. 6 of 6, Conf. 52, Sep. 24, 2000, pp. 2661–2665, XP001033022, ISBN: 0–7803–6508–9.

* cited by examiner

*Primary Examiner*—Andy Lee
(74) *Attorney, Agent, or Firm*—Stevens, Davis, Miller & Mosher, LLP

(57) ABSTRACT

In the equation for obtaining the number of increase or decrease bits Zij on each channel for each frame defined in the specification TS25.212 Ver.3.1.0 of 3GPP that is a standard organization of the 3rd generation digital mobile communication, Ndataj is multiplied by a calculation result of RMm*Nmj/RMm*Nmj. According to a rate matching calculation method of the present invention, the correction value $1/N^2$dataj is added in order to prevent the added whole value of the equation from exceeding 1 when Ndataj is multiplied.

5 Claims, 16 Drawing Sheets

| TrCH NUMBER | RM i | THE NUMBER OF BITS PER FRAME BEFORE RATE MATCHING |
|---|---|---|
| TrCH#1 | 256 | 270 |
| TrCH#2 | 250 | 690 |
| TrCH#3 | 240 | 540 |
| TrCH#4 | 200 | 600 |

FIG. 2

| TrCH NUMBER | $\Delta N_{ij}$ |
|---|---|
| TrCH#1 | +67(Repetition) |
| TrCH#2 | +153(Repetition) |
| TrCH#3 | +93(Repetition) |
| TrCH#4 | −13(Puncture) |

FIG. 3

RATE MATCHING CALCULATION METHOD AND RATE MATCHING APPARATUS

BACKGROUND OF THE INVENTION

1. Field of the Invention

The present invention relates to a rate matching calculation method and rate matching apparatus suitable for use in a radio apparatus in a digital mobile communication system.

2. Description of the Related Art

Specification TS25.212 Ver.3.1.0 of $3^{rd}$ Generation Partnership Project (3GPP) that is a standard organization of the 3rd generation digital mobile communication has regulations concerning a rate matching apparatus, which contains a calculation expressed by the following equation (1):

$$Z_{ij} = \left\lfloor \frac{\overbrace{\sum_{m=1}^{i} RM_m^b \cdot N_{mj}}^{}}{\underbrace{\sum_{m=1}^{I} RM_m \cdot N_{mj}}_{a}^{c}} \cdot N_{dataj} \right\rfloor \text{ for all } i = 1 \ldots I \quad (1)$$

where
RMi: rate matching attribute of TrCH#i
Ni,j: the number of bits per frame on TrCH#i
Ndata,j: the number of bits on CCTrCH
ΔNi,j: the number of increase or decrease bits on TrCH#i.

The importance of the equation (1) is explained herein.

When data items to be transmitted are simply arranged on a frame for each TrCH, there is a possibility that a bit is out of the frame, or that the frame only contains data items whose number is less than the number of data items capable of being transmitted in the frame. For example, it is assumed to using frames each with 1200 bits as the data, transmit TrCH#0 where the number of bits to be transmitted on a frame is 700, and transmit TrCH#1 where the number of bits to be transmitted on a frame is 600.

For example, it is assumed to transmit (a frame with) the data having 1200 bits, using TrcH#0 having a frame with 700 bits and TrCH#1 having a frame with 600 bits.

If TrCH#0 and TrCH#1 are transmitted without performing any processing, data of 100 bits is left (not transmitted). Then, in order to arrange TrCH#0 and TrCH#1 within a frame (1200 bits), the equation (1) is used to calculate the number of increase or decrease bits for each TrCH.

Further, in the equation (1), RMi that is a weight for each TrCH is considered, and therefore it is possible to perform the operation for increasing or decreasing the number of bits corresponding to "the importance indicated by RMi" of TrCH#0 and TrCH#1. That is, the equation (1) is such an equation that calculates the number of increase or decrease bits for each TrCH corresponding to the importance of each TrCH to be transmitted at the same time, in order to set the total number of data items on all TrCH to the number of bits per frame.

If a base station apparatus and mobile station have the different calculation results of the equation (1), i.e., the different numbers of increase or decrease bits, TrCH is not separated at a correct portion on data of a frame. Further, rate matching parameters (for use in performing rate matching processing for thinning or repeating data) which are calculated based on the number of increase or decrease bits obtained in the equation (1) become incorrect, and as a result, data cannot be decoded even when the error correction is performed. Thus, the equation (1) has an important role in both transmitting and receiving data.

The rate matching apparatus calculates the number of transmission data items per frame using the result calculated by the equation (1), and using a difference between the calculated number and the number of bits before the rate matching, and parameters calculated from those values, performs the rate matching. Then, data items on one or a plurality of channels subjected to the rate matching are connected to be transmitted.

FIG. 1 is a conceptual view showing Ni,j, Ndata,j, Zi,j and ΔNi,j. In addition, the number of channels is "3" in FIG. 1.

Each of the channel 1 (TrCH#1) and channel 2 (TrCH#2) has the number of bits less than the regulated number, and therefore the repetition is performed. The channel 3 (TrCH#3) has the number of bits equal to or more than the regulated number, and therefore the puncturing is performed. That is, the repetition corresponding to ΔN1,j is performed on the channel 1, the repetition corresponding to ΔN2,j is performed on the channel 2, and the puncturing corresponding to ΔN3,j is performed on the channel 3.

An example for calculating Zi,j is explained herein. In the example, it is assumed that Ndata,j is 2400 bits and the number of channels is "4". It is further assumed that RMi and the number of bits before the rate matching on each channel are values illustrated in FIG. 2.

The number of increase or decrease bits ΔNi,j is expressed by the equation (2):

$$\Delta N_{ij} = Z_{ij} - Z_{i-1,j} - N_{ij} \text{ for all } i=1 \ldots I \quad (2)$$

Calculation of the Denominator

The solution of the denominator of the equation (1) is "4991220" as indicated by the equation (3):

$$\sum_{m=1}^{4} RM_m \cdot N_{mj} = (256 \times 270) + (250 \times 690) + (240 \times 540) + \quad (3)$$
$$(200 \times 600)$$
$$= 491220$$

Calculation of ΔNi,j

With respect to TrCH#1, Z1,j is "337" as indicated by the equation (4):

$$Z_{1j} = \left\lfloor \frac{\sum_{m=1}^{1} RM_m \cdot N_{mj}}{491220} \cdot N_{dataj} \right\rfloor = \left\lfloor \frac{256 \times 270}{491220} \times 2400 \right\rfloor = 337 \quad (4)$$

Thereby, ΔN1,j is "67" as indicated by the equation (5):

$$\Delta N_{1j} = Z_{1j} - Z_{0j} - N_{1j} = 337 - 0 - 270 = 67 \quad (5)$$

Similarly, with respect to TrCH#2, Z2,j is "1180" as indicated by the equation (6):

$$Z_{2j} = \left\lfloor \frac{\sum_{m=1}^{2} RM_m \cdot N_{mj}}{491220} \cdot N_{dataj} \right\rfloor \quad (6)$$
$$= \left\lfloor \frac{256 \times 270 + 250 \times 690}{491220} \times 2400 \right\rfloor$$
$$= 1180$$

Further, ΔN2,j is "153" as indicated by the equation (7).

$$\Delta N_{2j} = Z_{2j} - Z_{1j} - N_{2j} = 1180 - 337 - 690 = 153 \quad (7)$$

Moreover, with respect to TrCH#3, Z3,j is "1813" as indicated by the equation (8).

$$Z_{3j} = \left\lfloor \frac{\sum_{m=1}^{3} RM_m \cdot N_{mj}}{491220} \cdot N_{dataj} \right\rfloor$$
$$= \left\lfloor \frac{256 \times 270 + 250 \times 690 + 240 \times 540}{491220} \times 2400 \right\rfloor$$
$$= 1813$$

Further, $\Delta N_{3,j}$ is "93" as indicated by the equation (9):

$$\Delta N_{3j} = Z_{3j} - Z_{2j} - N_{3j} = 1813 - 1180 - 540 = 93 \quad (9)$$

Then, with respect to TrCH#4, Z4,j is "2400" as indicated by the equation (10):

$$Z_{4j} = \left\lfloor \frac{\sum_{m=1}^{4} RM_m \cdot N_{mj}}{491220} \cdot N_{dataj} \right\rfloor$$
$$= \left\lfloor \frac{256 \times 270 + 250 \times 690 + 240 \times 540 + 200 \times 600}{491220} \times 2400 \right\rfloor$$
$$= 2400$$

Further, $\Delta N_{4,j}$ is "−13" as indicated by the equation (11):

$$\Delta N_{4j} = Z_{4j} - Z_{3j} - N_{4j} = 2400 - 1813 - 600 = 13 \quad (11)$$

As described above, the number of increase or decrease bits $\Delta N_{i,j}$ on each channel is as illustrated in FIG. 3. That is, TrCH#1 has +67 (Repetition), TrCh#2 has +153 (Repetition), TrCH#3 has +93 (Repetition), and TrCH#4 has −13 (Puncturing).

The calculations of rate matching parameters are performed in a channel codec section in each of transmitting and receiving factions in a mobile station apparatus and a base station apparatus.

FIG. 4 is a block diagram illustrating a configuration of a channel codec section in a receiving function in a mobile station apparatus. FIG. 5 is a block diagram illustrating a configuration of a channel codec section in a receiving function in a base station apparatus. FIG. 6 is a block diagram illustrating a configuration of a channel codec section in a transmitting function in the mobile station apparatus. FIG. 7 is a block diagram illustrating a configuration of a channel codec section in a transmitting function in the base station apparatus.

In these figures, each of reference numerals 1, 2, 3 and 4 denotes a rate matching parameter calculator for calculating rate matching parameter. Rate matching parameter calculator 1 in the transmitting function outputs rate matching parameters Xi, eini, eplus, and eminus, and based on these rate matching parameters, rate matching processor 5 performs the rate matching processing. Further, rate matching parameter calculator 2 in the transmitting function outputs rate matching parameters Xi, eini, eplus, and eminus. Then, based on these rate matching parameters, rate matching processor 6 performs the rate matching processing.

Meanwhile, rate matching parameter calculator 3 in the receiving function outputs rate matching parameters Xi, eini, eplus, and eminus. Then, based on these rate matching parameters, rate matching processor 7 performs the rate matching processing.

Further, rate matching parameter calculator 4 in the receiving function outputs rate matching parameters Xi, eini, eplus, and eminus. Then, based on these rate matching parameters, rate matching processor 8 performs the rate matching processing.

The operations of rate matching parameter calculations 1 to 4 are indicated in corresponding flowcharts in FIGS. 8 to 12. FIG. 8 is a flowchart showing the operation of rate matching parameter calculator 1, FIGS. 9 to 11 are flowcharts showing the operation of the rate matching parameter calculator 2, and FIG. 12 is a flowchart showing the operation of rate matching parameter calculator 4. In addition, the operation of rate matching parameter calculator 3 is the same as the operation of rate matching parameter calculator 2, and is omitted in showing the flowchart thereof.

Rate matching parameter calculator 1 determines Ndata,j using a type of data and the number of channels (step 1), and then determines the number of increase or decrease bits on each channel (step 2). After determining the number of increase or decrease bits on each channel, the calculator 1 calculates rate matching parameters Xi, eini, eplus and eminus (step 3).

Rate matching parameter calculator 2 first receives as its input the number of channels on CCTrCH (step 10). Then, the calculator 2 judges the type of rate matching (step 11). In this case, there are two types of rate matching, namely, Fixed Position and Flexible Position. In the case of Fixed Position, the processing flow proceeds to step 12. At step 12, Ni, . is calculated.

After calculating Ni,., it is judged whether a mode is a normal mode or a compressed mode by SF/2 (Spreading factor reduction) (step 13). In the case of the Fixed Position with the normal mode or compressed mode by SF/2, the processing of step 14 is executed. That is, the number of bits is calculated by which the repetition or puncturing is performed within the number of bits per frame on each TrCH, and then the number of bits is calculated by which the repetition or puncturing is performed within the number of bits per TTI on each TrCH. After calculating each of the numbers of bits, the rate matching parameters Xi, eini, eplus and eminus are calculated.

In the case of the Fixed Position with a compressed mode by puncturing, the processing of step 15 is executed after calculating Ni,. at the step 12. That is, the number of bits is calculated by which the repetition or puncturing is performed within the number of bits per frame on each TrCH, and then the number of bits is calculated by which the repetition or puncturing is performed within the number of bits per TTI on each TrCH. The calculations are performed based on the maximum TTI among all TrCH to be calculated. As an example, it is assumed that on TrCH with TrCH#1 and TrCH#2 to be calculated, TTI of TrCH#1 is 20 ms, and that TTI of TrCH#2 is 40 ms. At this point, the maximum TTI is 40 ms. Further, since TTI of TrCH#1 is 20 ms, it is considered that two TTI of TrCH#1 are contained in 40 ms. Therefore, the number of bits is calculated twice by which the repetition or puncturing is performed. Meanwhile, since TTI of TrCH#2 is 40 ms, the above calculation is performed once.

The next processing flow proceeds to step 16 to calculate Pbit that is bit for making a Gap (portion where data transmission is not performed) for the compressed mode. Pbit bits per frame are allocated to each TrCH, using on each TrCH, RMi and the number of bits per frame before the base station transmission rate matching (or receiver reception rate matching). After that, at step 17, the total number of bits for the Pbit is calculated in each TTI on each TrCH. Then, at step 18, the total number of bits for the Pbit is subtracted from the above-obtained number of increase or decrease bits, whereby the final number of increase or decrease bits in each TTI on each TrCH is obtained. After that, the rate matching parameters Xi, eini, eplus and eminus are calculated.

Meanwhile, when the judgment at the step 11 indicates Flexible Position, the processing flow proceeds to step 19, where Ni,j is calculated in all TF on all TrCH mapped on CCTrCH. After calculating Ni,j on in all TF on all TrCH, the temporary number of bits is calculated by which the repetition or puncturing is performed within the number of bits per TTI on each TrCH (step 20). D is next calculated in combination of all TF, and examined whether D exceeds Ndata,j (step 21). D is indicative of the number of bits on CCTrCH at the time of TFCj. When D exceeds Ndata,j, the number of bits is recalculated by which the repetition or puncturing is performed within the number of bits per TTI on each TrCH. On the other hand, when D does not exceed Ndata,j, the recalculation is not performed. After calculating these numbers of bits, each of the rate matching parameters Xi, eini, eplus and eminus is calculated.

Rate matching parameter calculator 3 performs the same operation as rate matching parameter calculator 2.

Rate matching parameter calculator 4 determines Δ Ni,j corresponding to the type of data and the number of channels (step 30), and then calculates each of rate matching parameters Xi, eini, eplus and eminus (step 31).

However, in the conventional rate matching calculation method, when data on a plurality of channels are connected and transmitted, it is necessary for a receiving side to fetch data for each TrCH from an accurate position where each channel is connected by a transmitting side, otherwise problems arise that data positions are all shifted and the decoding is impossible.

The previously described equation (1) is used to calculate the number of bits on each channel. In calculating the equation, there is a case that a correct result is not obtained due to the accuracy limitation in division. In such a case, there occurs a difference of the calculation result between the transmitting side and receiving side. when such a difference occurs, as described above, the receiving side is incapable of decoding, and as a result, the communication is made impossible.

It is an object of the present invention (see the Third Embodiment of the invention described below) to provide a method for first multiplying b with c and dividing a result of the multiplication by a in the equation (1) to solve the problem on the calculation accuracy. This enables both the transmitting side and the receiving side to calculate the correct number of bits and to perform excellent communications. However, in some applications, this technique may be impractical, in that the calculated value exceeds 32 bits, and it may not be possible to achieve calculating the value in a divider in an existing 32-bit calculator. To overcome this problem in such applications, the following method and apparatus is provided.

SUMMARY OF THE INVENTION

It is an object of the present invention to provide a rate matching calculation method and rate matching apparatus that enable the correct number of bits to be calculated always on both a transmitting side and receiving side. This object is achieved by adding a correction value to a calculation result of b/a, i.e., by adding $1/c^2$ to the result of b/a in the equation (1) for use in obtaining the number of increase or decrease bits on each channel.

$$Z_{ij} = \left\lfloor \frac{\sum_{m=1}^{i} RM_m^b \cdot N_{mj}}{\sum_{m=1}^{I} RM_m \cdot N_{mj}} \cdot N_{dataj} \right\rfloor \text{ for all } i = 1 \ldots I \quad (1)$$

The result of b/a is multiplied by c in the equation (1), however, since there is a case that a calculation result is obtained which is smaller than a true division result due to the calculation accuracy in b/a, it sometimes happens that a value smaller than the true value is obtained as the result of the equation (1). In order to prevent the occurrence of such a situation, the correction value is added to the calculation result of b/a. However, if the correction value is excessively large, a value is calculated which is larger than the true value of the equation (1). Then, as indicated by the equation (12), $1/c^2$ is added in order to prevent the added whole value of the equation (1) from exceeding 1 when c is multiplied.

$$X = \left\lfloor \left( \frac{b}{a} + \frac{1}{C^2} \right) \times c \right\rfloor \quad (12)$$

As indicated by the equation (12), $1/C^2$ is added to the division result, and then c is multiplied by the result that is larger than the division result, whereby the result becomes larger than the result of the equation (1). In the equation (1), the calculation is performed while rounding down to the nearest one at the final step, and therefore if an increased value is smaller than 1, the increased value is abandoned by the rounding down performed at the final step of the equation (1).

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 2 is a view showing an example of RMi and the number of bits per frame before the rate matching on each TrCH;

FIG. 3 is a view showing ΔNi,j on each TrCH when the number of bits is as shown in FIG. 2;

DETAILED DESCRIPTION OF THE PREFERRED EMBODIMENTS

Preferred embodiments of the present invention will be described specifically below with reference to accompanying drawings.

(First Embodiment)

Figure 6:
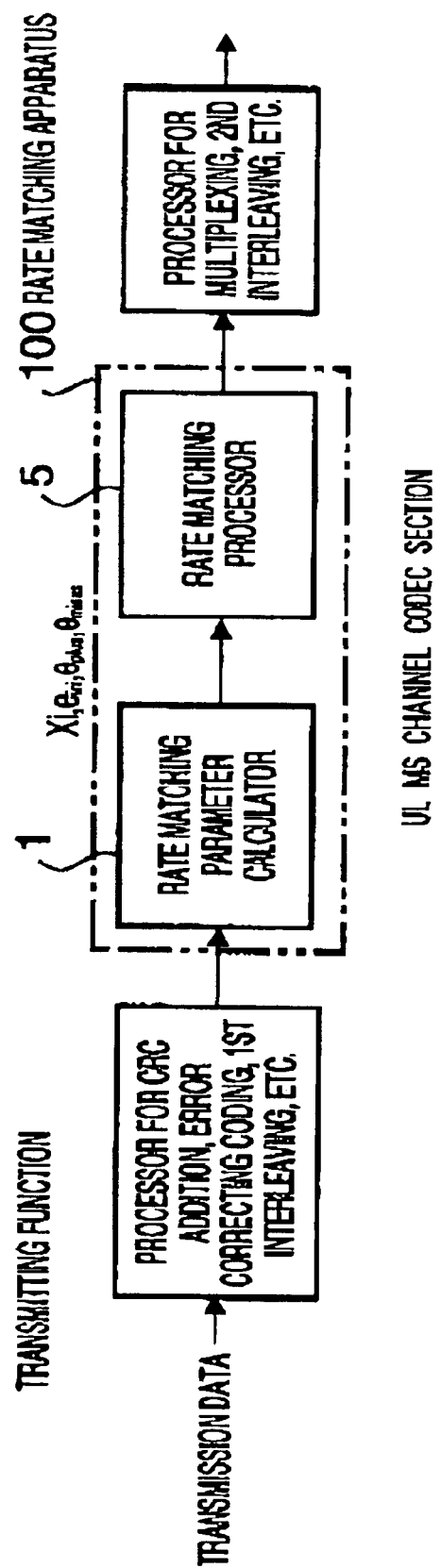
FIG. 6 is a block diagram illustrating a configuration of a channel codec section in a transmitting function in the conventional mobile station apparatus or base station apparatus.
Figure 13:
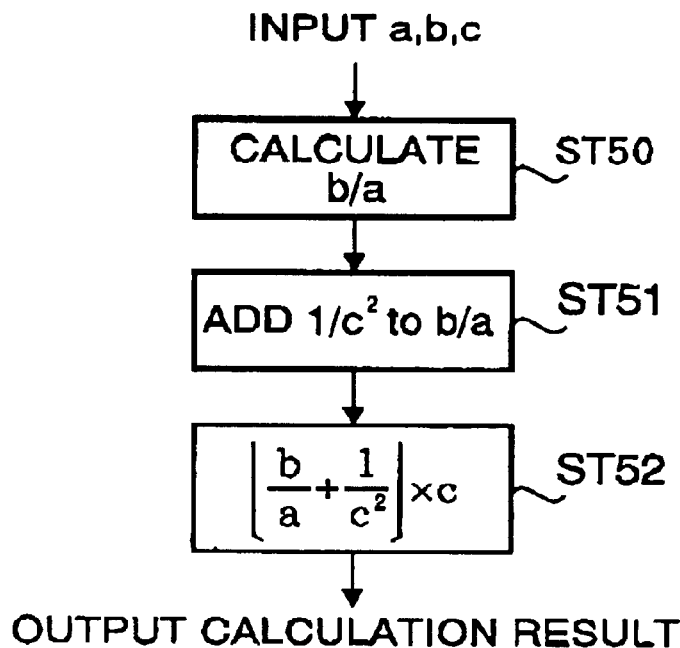
FIG. 13 is a flowchart to explain the operation of a rate matching apparatus according to a first embodiment of the present invention.

FIG. 13 is a flowchart showing calculation processes of the equation (1) in a rate matching apparatus according to the first embodiment of the present invention. In addition, the rate matching apparatus of the first embodiment is comprised of, for example, rate matching parameter calculator 1 and rate matching processor 5 in FIG. 6 described previously. Hereinafter it is assumed that rate matching apparatus 100 in FIG. 6 is used as the rate matching apparatus of the first embodiment.

Rate matching apparatus 100 first performs the calculation of b/a (step 50) in the calculation of the equation (1), and then adds $1/c^2$ to the calculation result (step 51). After adding $1/c^2$, the result is further multiplied by c. As previously described, by adding $1/c^2$ to the calculation result of b/a, and multiplying the added result larger than the result of b/a by c, the result becomes larger than the result of the equation (1). That is, since the Floor calculation for rounding down to the nearest one is performed at the final step of the equation (1), if an increased value is smaller than 1, the increased value is abandoned by the rounding down.

Accordingly, as indicated by the equation (12), it is possible to obtain a correct calculation result by adding $1/c^2$ to the division result, and multiplying the added result by c. It is thereby possible for both the transmitting side and receiving side to calculate the correct number of bits, and to perform excellent communications.

$$X = \left\lfloor \left( \frac{b}{a} + \frac{1}{c^2} \right) \times c \right\rfloor \quad (12)$$

(Second Embodiment)

Figure 14:
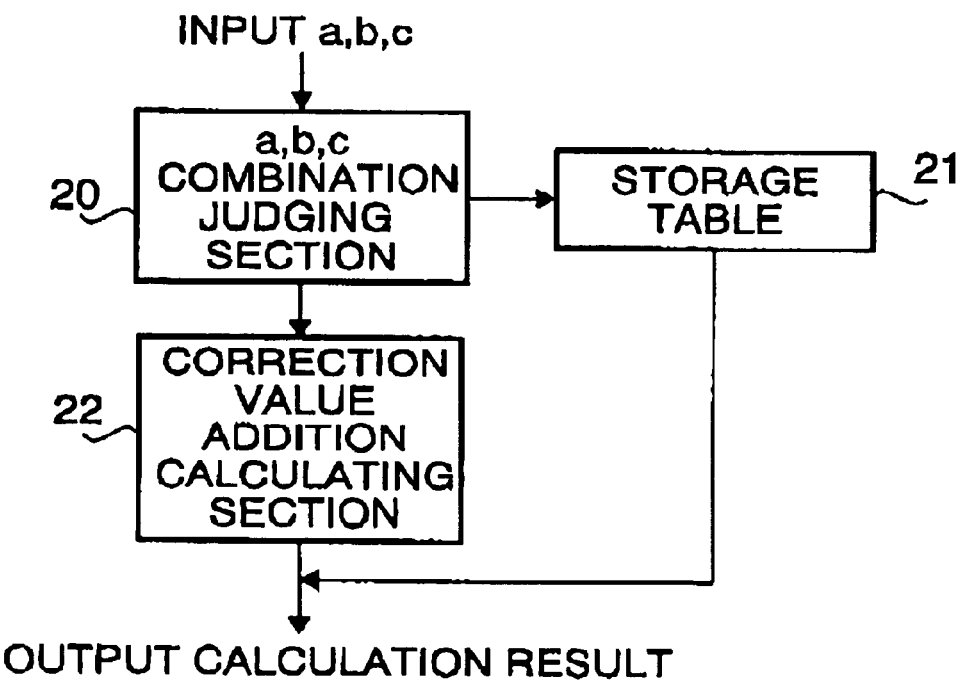
FIG. 14 is a flowchart to explain the operation of a rate matching apparatus according to a second embodiment of the present invention.

FIG. 14 is a block diagram illustrating a section for performing the calculation of the equation (1) in the rate matching apparatus according to the second embodiment of the present invention.

As illustrated in FIG. 14, the section for performing the calculation of the equation (1) is comprised of abc combination judging section 20, storage table 21, and correction value addition calculating section 22.

The second embodiment is effective particularly in a case that a correct result is not obtained even using the method in the above-mentioned first embodiment. Storage table 21 stores in advance combinations of a, b and c providing incorrect solutions and correct calculation results corresponding to the combinations. When the combination judging section 20 judges that an input combination of a, b and a is the combination providing the incorrect result, the section 20 reads out the calculation result corresponding to the combination from storage table 21 to output. On the other hand, when the section 20 judges that input a, b and c are of a combination providing the correct result, each value of a, b and c is input to correction value addition calculating section 22 that performs the same processing as in the first embodiment, and the correct calculation result is output from the section 22. Accordingly, as well as in the second embodiment, is it possible for both the transmitting side and receiving side to calculate the correct number of bits, and to perform excellent communications.

(Third Embodiment)

A rate matching apparatus according to the third embodiment of the present invention first performs the multiplication (b×c) of the numerator in the calculation in the equation (1), as indicated in the equation (13), and then divides the multiplication result by a.

$$X = \left\lfloor \left( \frac{b \times c}{a} \right) \right\rfloor \quad (13)$$

By first performing the multiplication of the numerator, and dividing the multiplication result, a more accurate calculation result is obtained than the inverse case (i.e., the case that the result of b/a is multiplied by c). Accordingly, also in the third embodiment, it is possible for both the transmitting side and receiving side to calculate the correct number of bits, and to perform excellent communications.

(Fourth Embodiment)

In the calculation method of the equation (1) in the first embodiment described previously, it sometimes happens that the multiplication result of the numerator exceeds 32 bits (maximum 43 bits), and due to the 3GPP specification, it is difficult for the existing 32-bit calculator to achieve the division.

Hence, the fourth embodiment explains a case that the value of b×c is divided into upper 28 bits and lower 15 bits to calculate, and thereby enables the calculation in the 32-bit calculator. In other words, the value of b×c is divided into upper 28 bits and lower 15 bits, and a is subtracted from the upper 28 bits. Then, when the subtraction is enabled, "1" is set, while when the subtraction is disabled, "0" is set. Then after finishing the subtraction once, the upper 28 bits are shifted to the left by 1 bit, α is added to the lowest bit of the lower bits. The calculation being performed while shifting the value of upper 28 bits of b/c by 1 bit is repeatedly performed 17 times.

Figure 15:
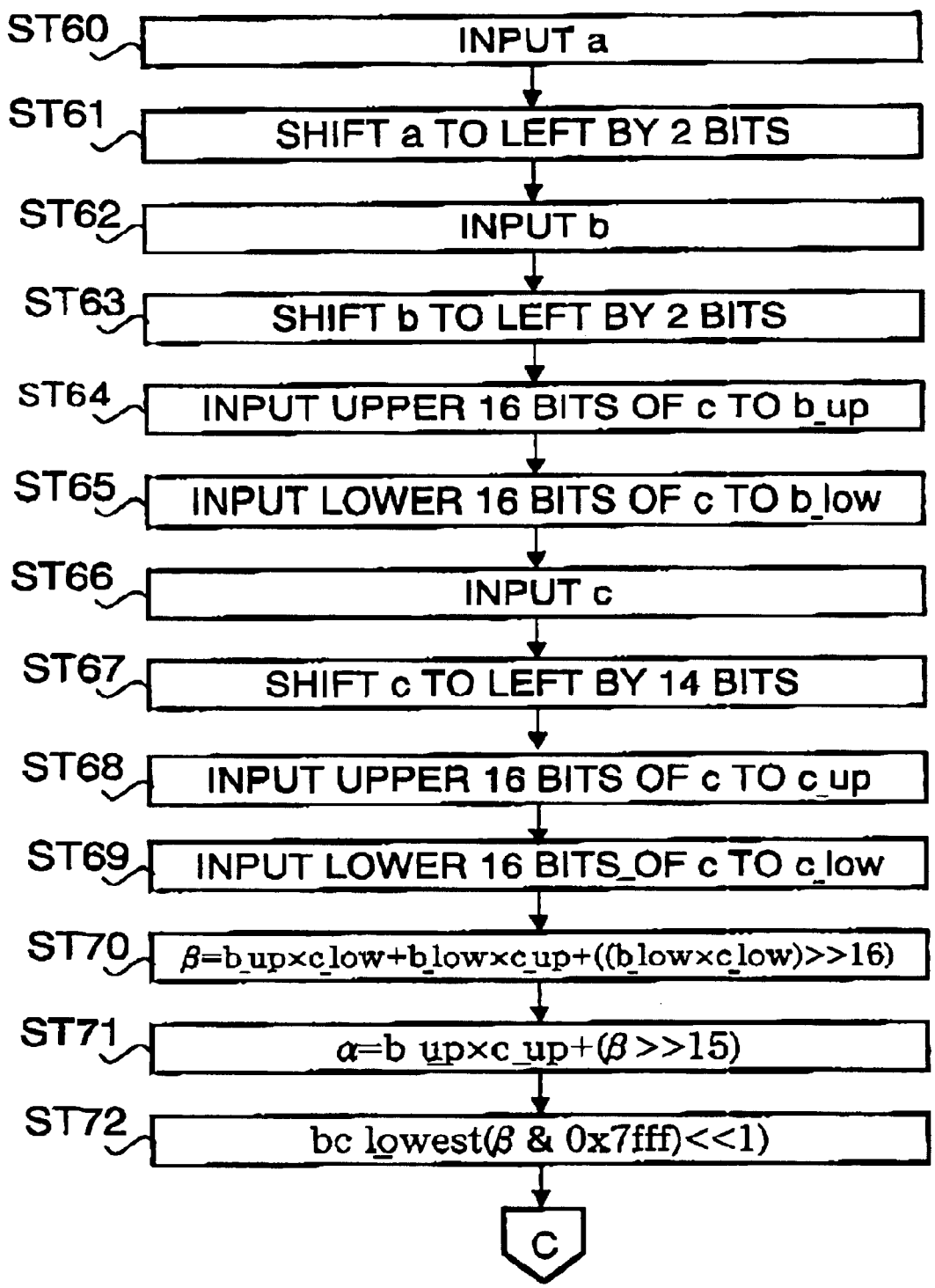
FIG. 15 is a flowchart to explain the operation of a rate matching apparatus according to a fourth embodiment of the present invention.
Figure 16:
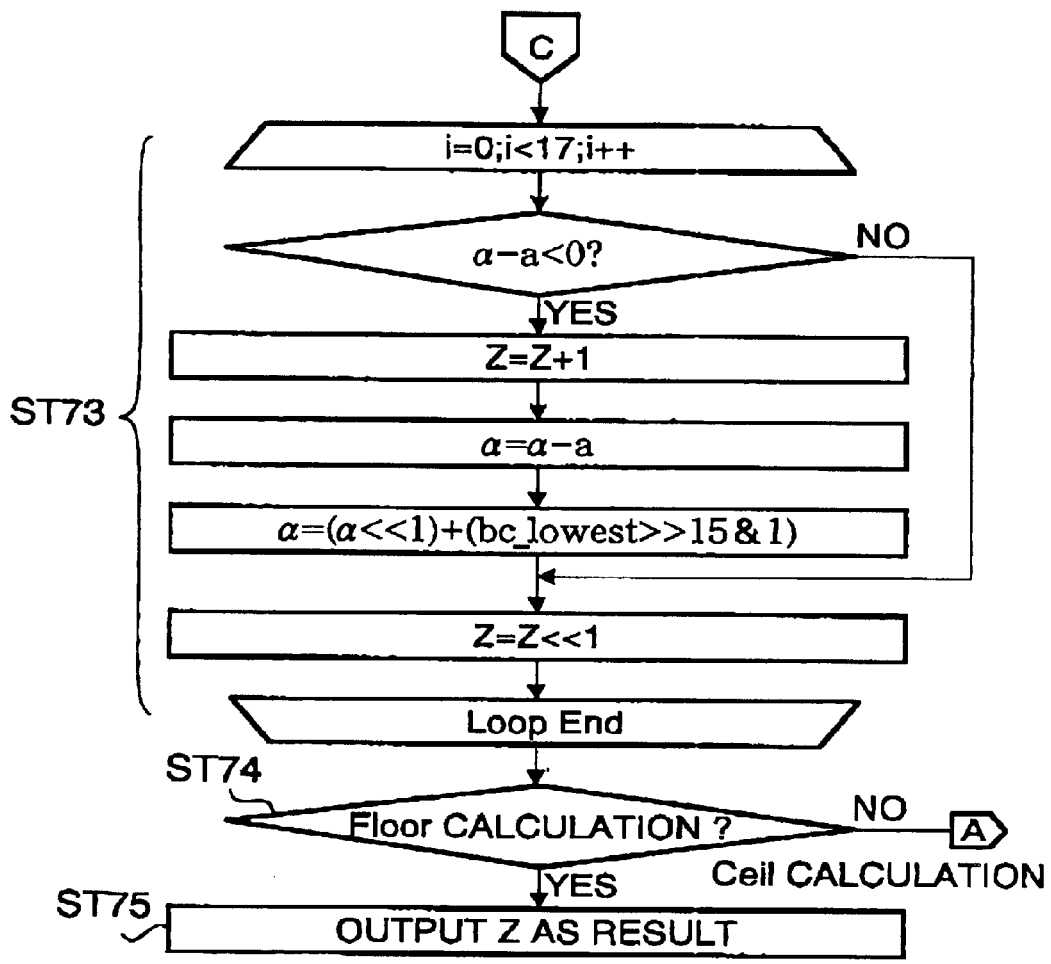
FIG. 16 is another flowchart to explain the operation of the rate matching apparatus according to the fourth embodiment of the present invention.
Figure 17:
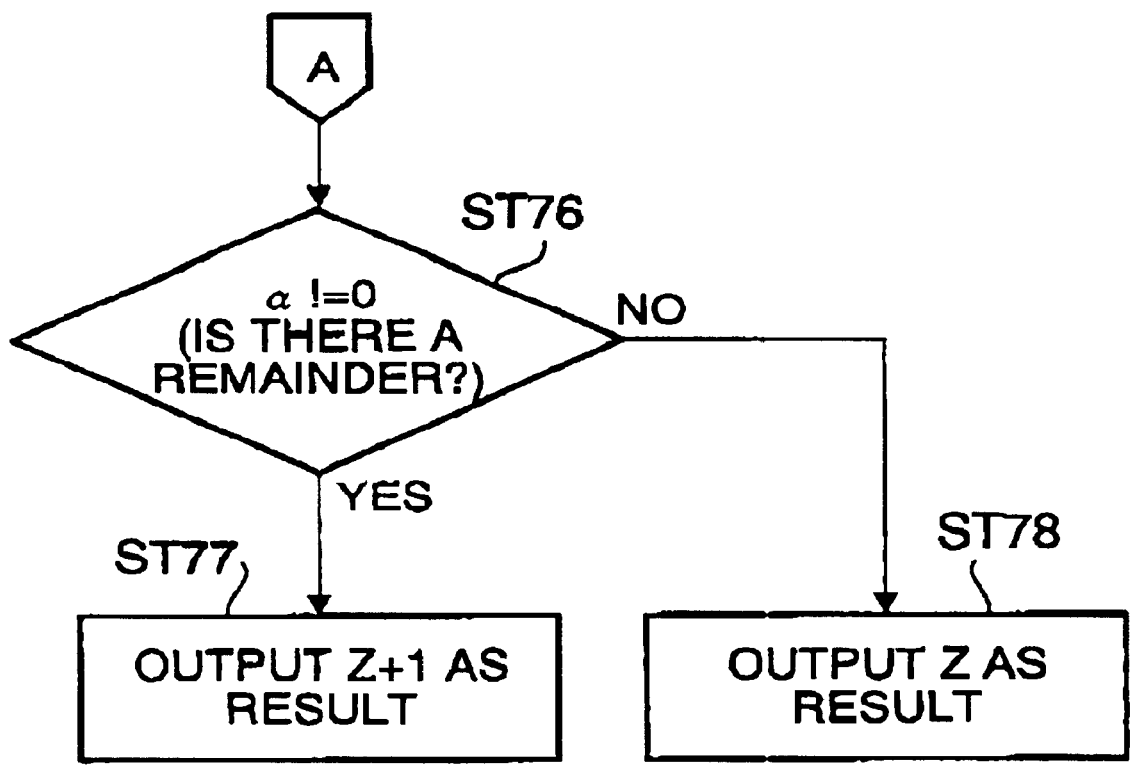
FIG. 17 is another flowchart to explain the operation of the rate matching apparatus according to the fourth embodiment of the present invention.
Figure 18:
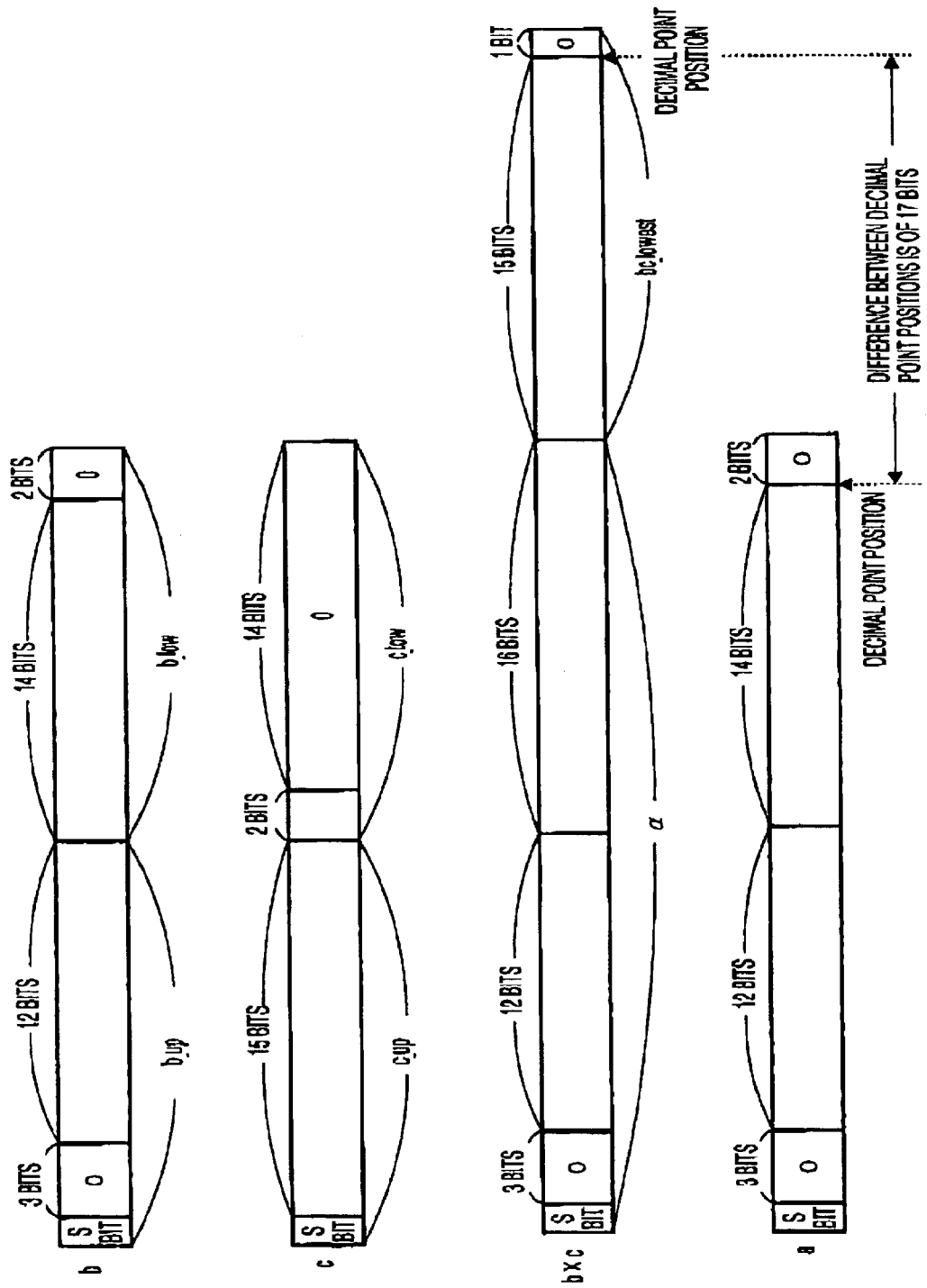
FIG. 18 is a conceptual view of a memory to explain the operation of the rate matching apparatus according to the fourth embodiment of the present invention.

Flowcharts shown in FIGS. 15 to 17 indicate the calculation method of the fourth embodiment. FIG. 18 is a conceptual view of a memory. The calculation method in the fourth embodiment will be explained specifically below with reference to these drawings.

First, a is input, and is shifted to the left by 2 bits (steps 60 and 61). Then, b is input, and is shifted to the left by 2 bits (steps 62 and 63). The upper 16 bits of b are input to b_up (step 64), and the lower 16 bits of b are input to b_low (step 65). Then, c is input, and is shifted to the left by 14 bits (steps 66 and 67). The upper 16 bits of c are input to c_up (step 68), and the lower 16 bits of c are input to c_low (step 69).

Next, b is multiplied by c. The multiplication of b by c is calculated using α and β obtained in the following. β is first obtained (step 70). β is obtained by adding the product of the upper 16 bits of b input to b_up and the lower 16 bits of c input to c_low and the product of the lower 16 bits of b input to b_low and the upper 16 bits of c input to c_low, and further adding the above-calculated sum to data obtained by shifting the product of the lower 16 bits of b input to b_low and the lower 16 bits of c input to c_low to the right by 16 bits.

After obtaining β, α is obtained (step 71). In this case, in order to obtain α, the upper 16 bits of β is added to the product of the upper 16 bits of b input of b_up and the upper 16 bits of c input of c_up (the highest bit is a sign bit, and therefore adding the data obtained by shifting to the right by 15 bits equals adding the upper 16 bits). In addition, since the lowest bit of β is a sign bit, the upper 16 bits contain the upper second to 17th bits correctly.

Next, the lower 15 bits of β are input to bc_lowest. In this case, the lower 15 bits of β are not input to bc_lowest with no operation, and data obtained by shifting the lower bits to the left by 1 bit is input. This operation is performed to move a position of the decimal point of b×c between the lowest bit and lower second bit. In addition, the position of the decimal point is associated with that "a is shifted to the left by 2 bits" at the step 61. This is such an operation that moves a position of the decimal point between the lower second and third bits, whereby a difference between the positions of decimal point of a and of that of b×c is of 17 bits.

Next, the calculation is performed while shifting a value indicative of b×c by 1 bit in a division loop (step 73). In this case, since the difference between the decimal point positions of a and of b×c is of 17 bits, performing the processing of the step 17 repeatedly 17 times equals performing the division whose solution is an integer. Then, bits remaining in a are indicative of a remainder of the division.

After performing the division, when the processing is the Floor (rounding down) calculation, Z is output as the calculation result. Meanwhile, when the processing is the ceil (rounding up) calculation, Z+1 is output as the calculation result if there is a remainder, while Z is output as the calculation result if there is no remainder.

When the multiplication result of b×c exceeds 32 bits, it is made difficult for the existing 32-bit calculator to achieve the division, due to the 3GPP specification. However, according to the fourth embodiment, the value of b×c is divided into upper 28 bits and lower 15 bits to calculate, whereby it is possible to perform the calculation using the 32-bit calculator. Accordingly, even in the third embodiment, it is possible for both the transmitting side and receiving side to calculate the correct number of bits, and thereby excellent communications can be performed.

Further, since it is only required to repeatedly perform 17 times the calculation that is performed while shifting a value of upper 28 bits of b×c by 1 bit, the calculation amount becomes less than a case that the calculation is performed without dividing the value of b×c into upper bits and lower bits. It is thereby possible to shorten the time taken to complete the rate matching.

Figure 1:
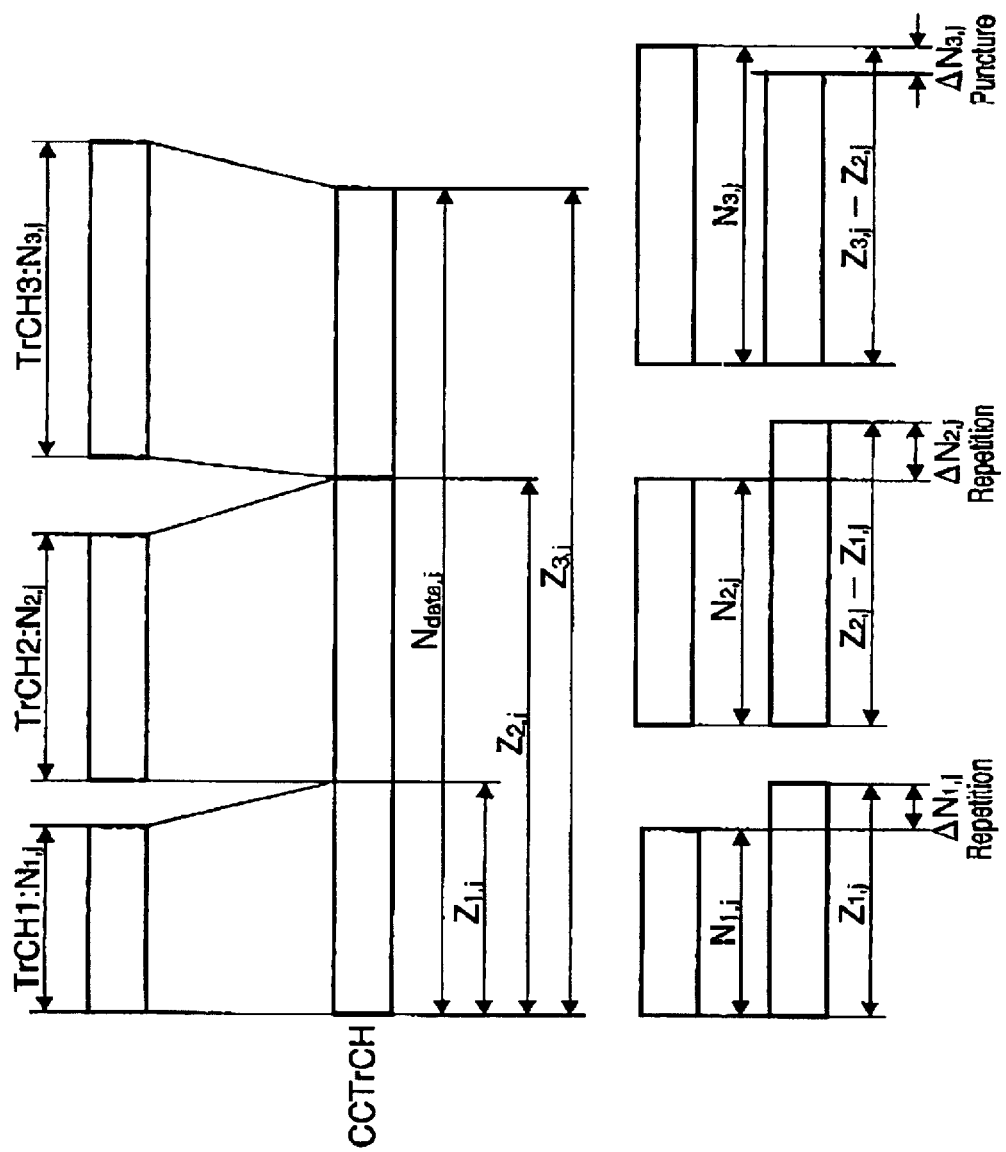
FIG. 1 is a conceptual view showing various parameters in the calculation equation conforming to the specification on a rate matching apparatus.
Figure 4:
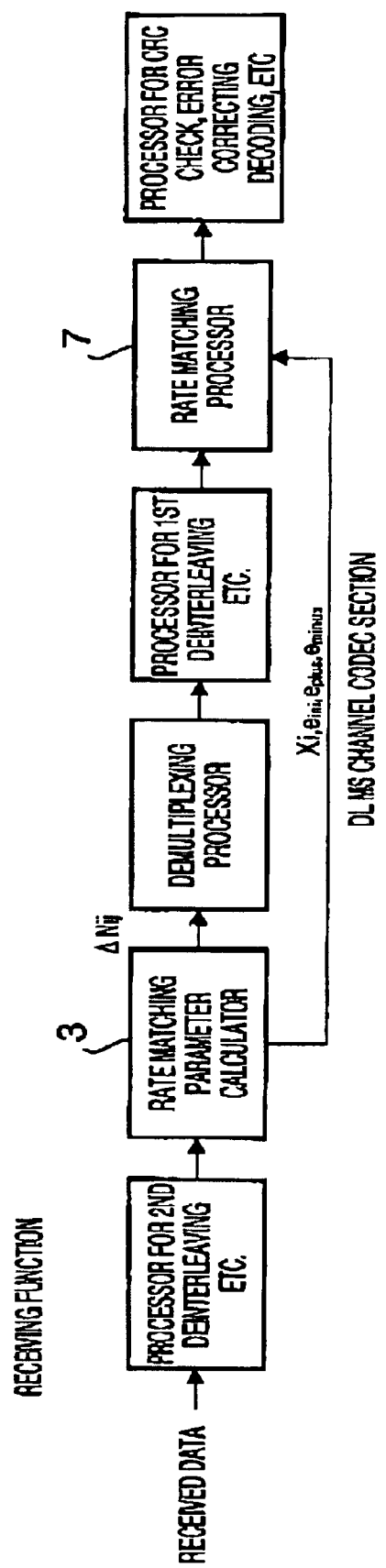
FIG. 4 is a block diagram illustrating a configuration of a channel codec section in a receiving function in a conventional mobile station apparatus or base station apparatus.
Figure 5:
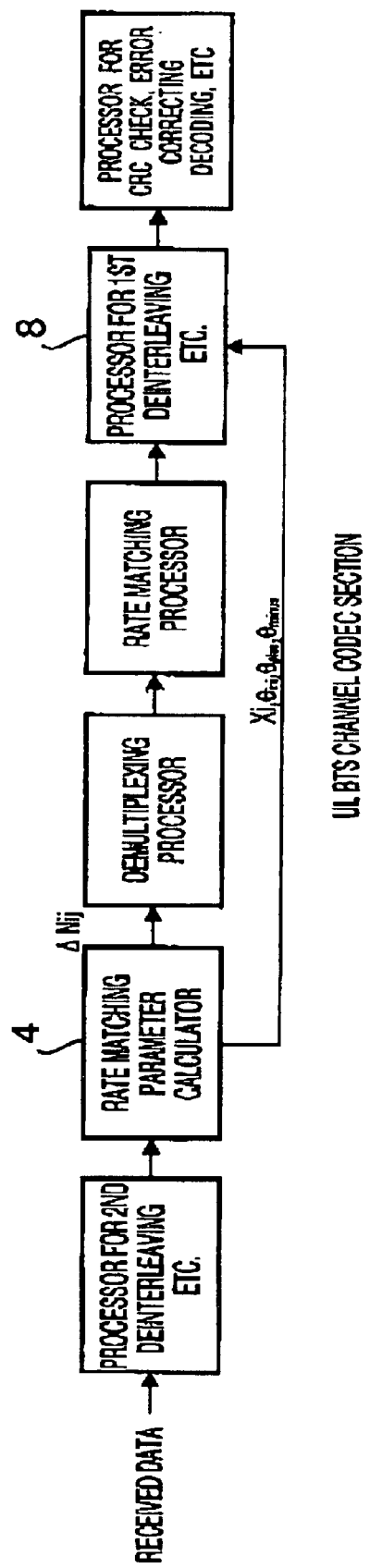
FIG. 5 is a block diagram illustrating a configuration of a channel codec section in the receiving function in the conventional mobile station apparatus or base station apparatus.
Figure 7:
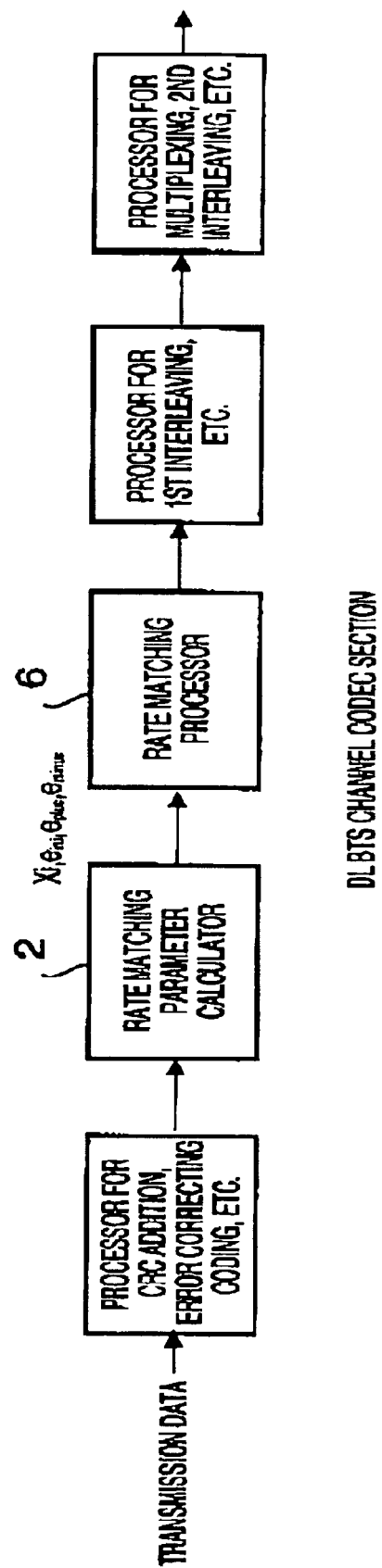
FIG. 7 is a block diagram illustrating a configuration of a channel codec section in a transmitting function in the conventional mobile station apparatus or base station apparatus.
Figure 8:
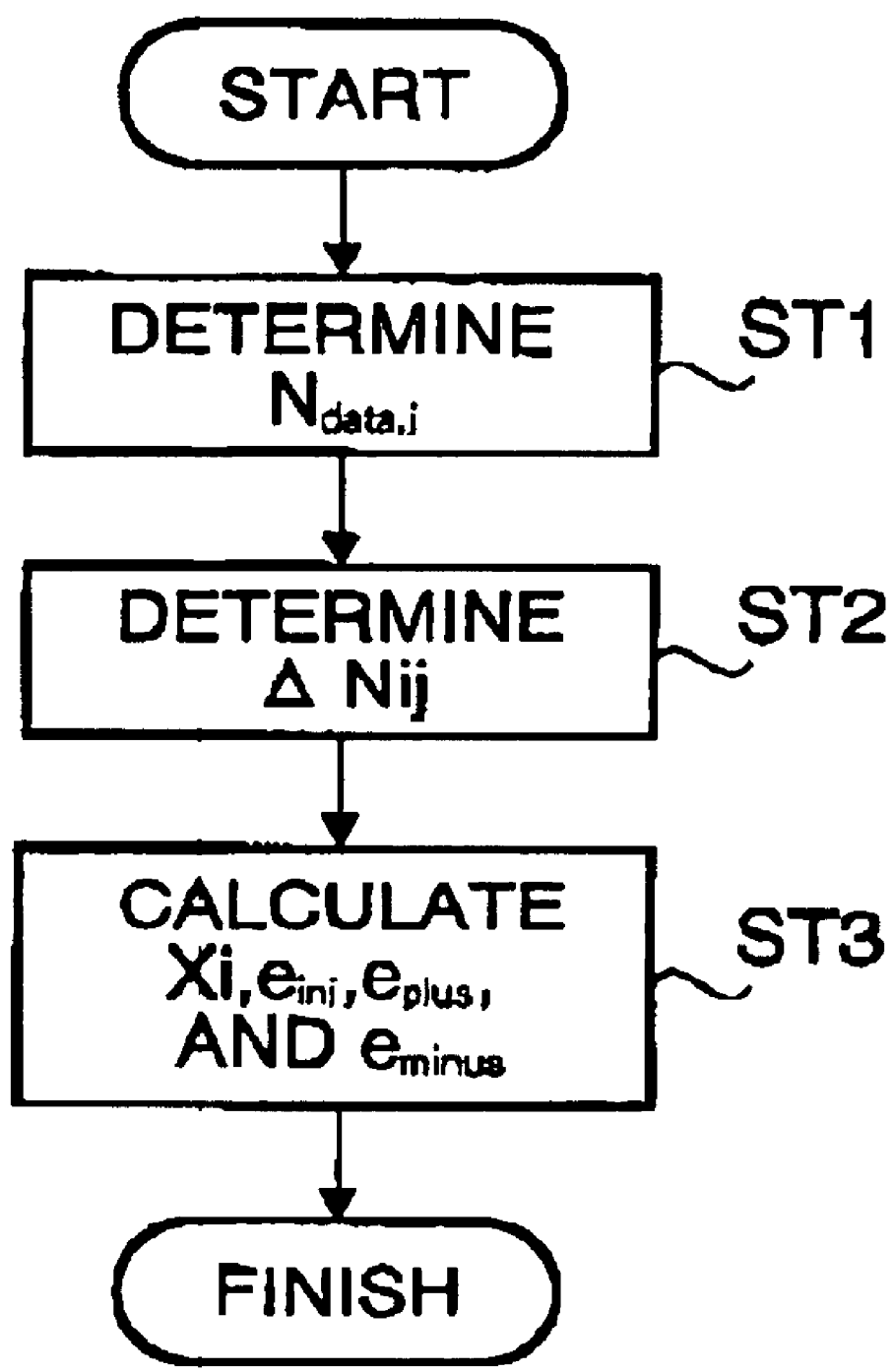
FIG. 8 is a flowchart to explain the operation of a rate matching parameter calculator in the channel codec section in the transmitting function in the conventional mobile station apparatus.
Figure 9:
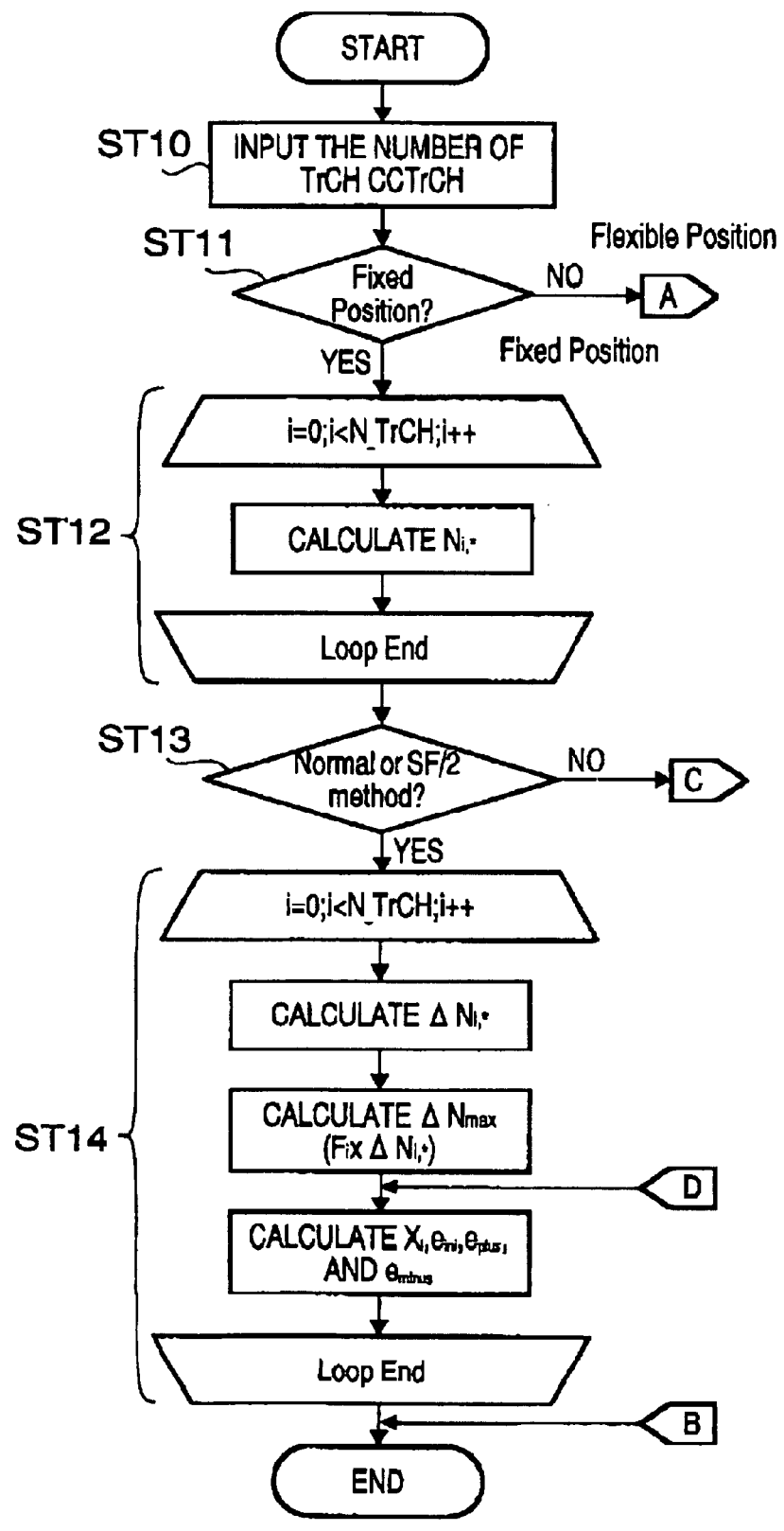
FIG. 9 is a flowchart to explain the operation of a rate matching parameter calculator in the channel codec section in the transmitting function in the conventional base station apparatus.
Figure 10:
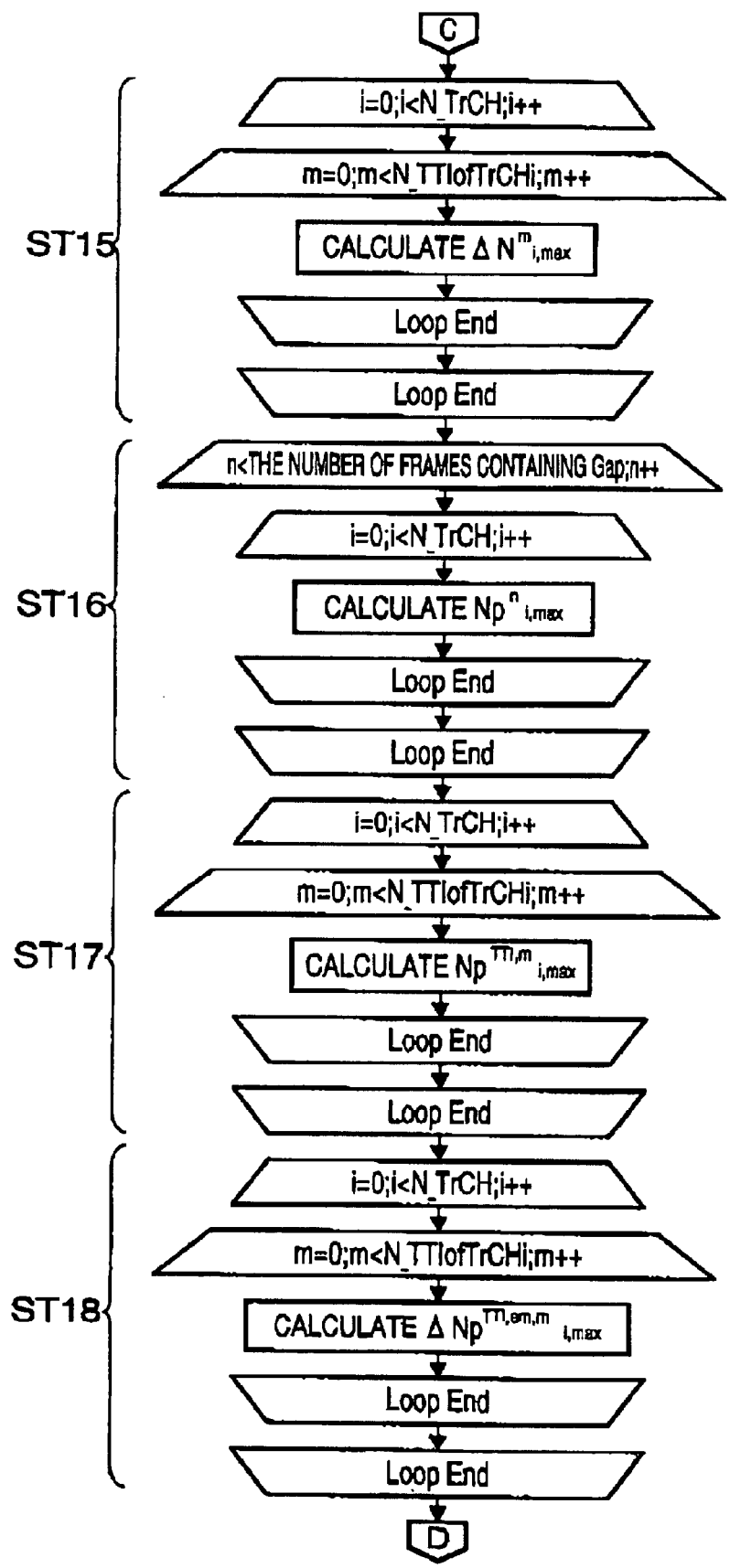
FIG. 10 is another flowchart to explain the operation of the rate matching parameter calculator in the channel codec section in the transmitting configuration in the conventional base station apparatus.
Figure 11:
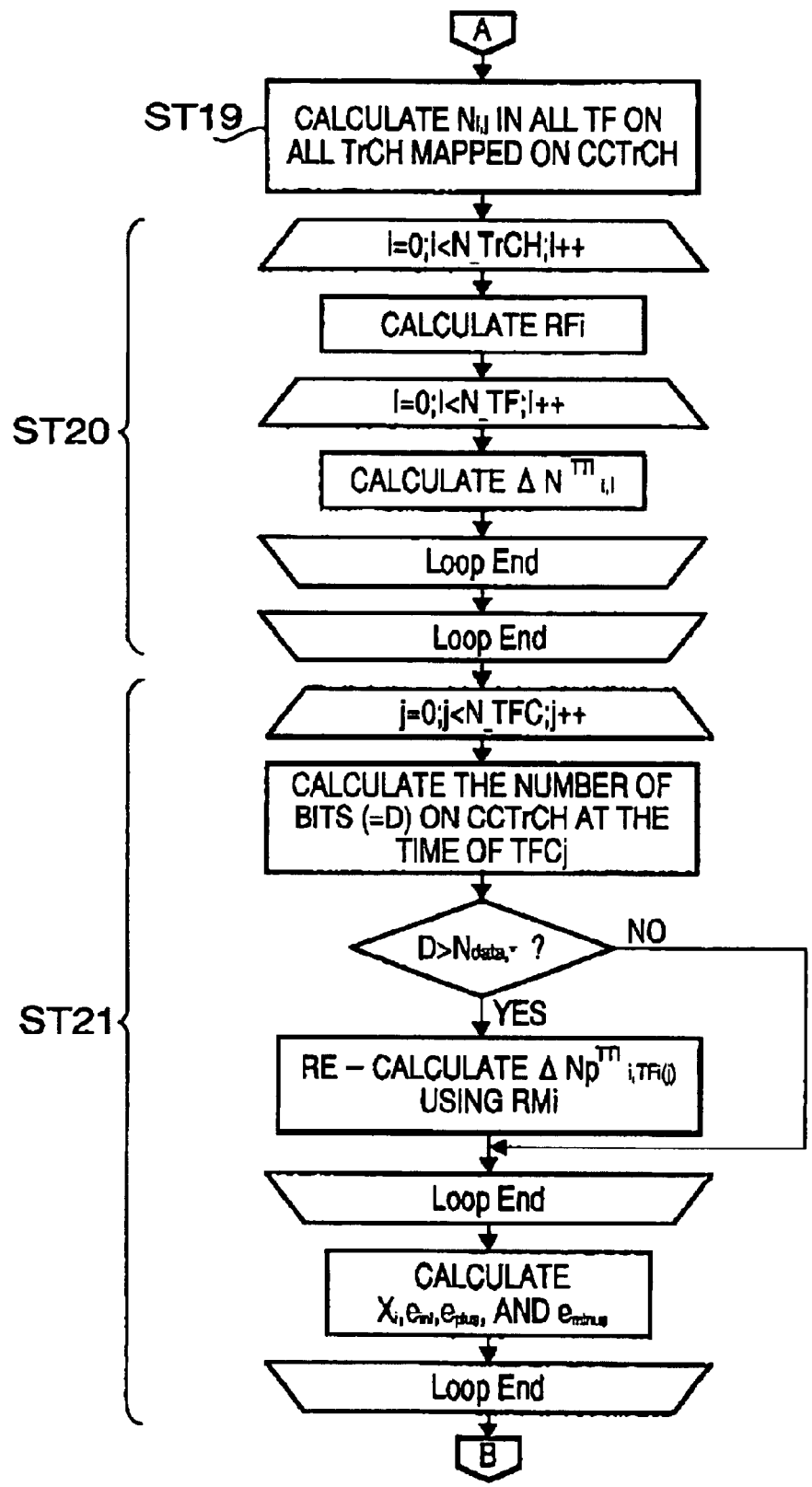
FIG. 11 is another flowchart to explain the operation of the rate matching parameter calculator in the channel codec section in the transmitting configuration in the conventional base station apparatus.
Figure 12:
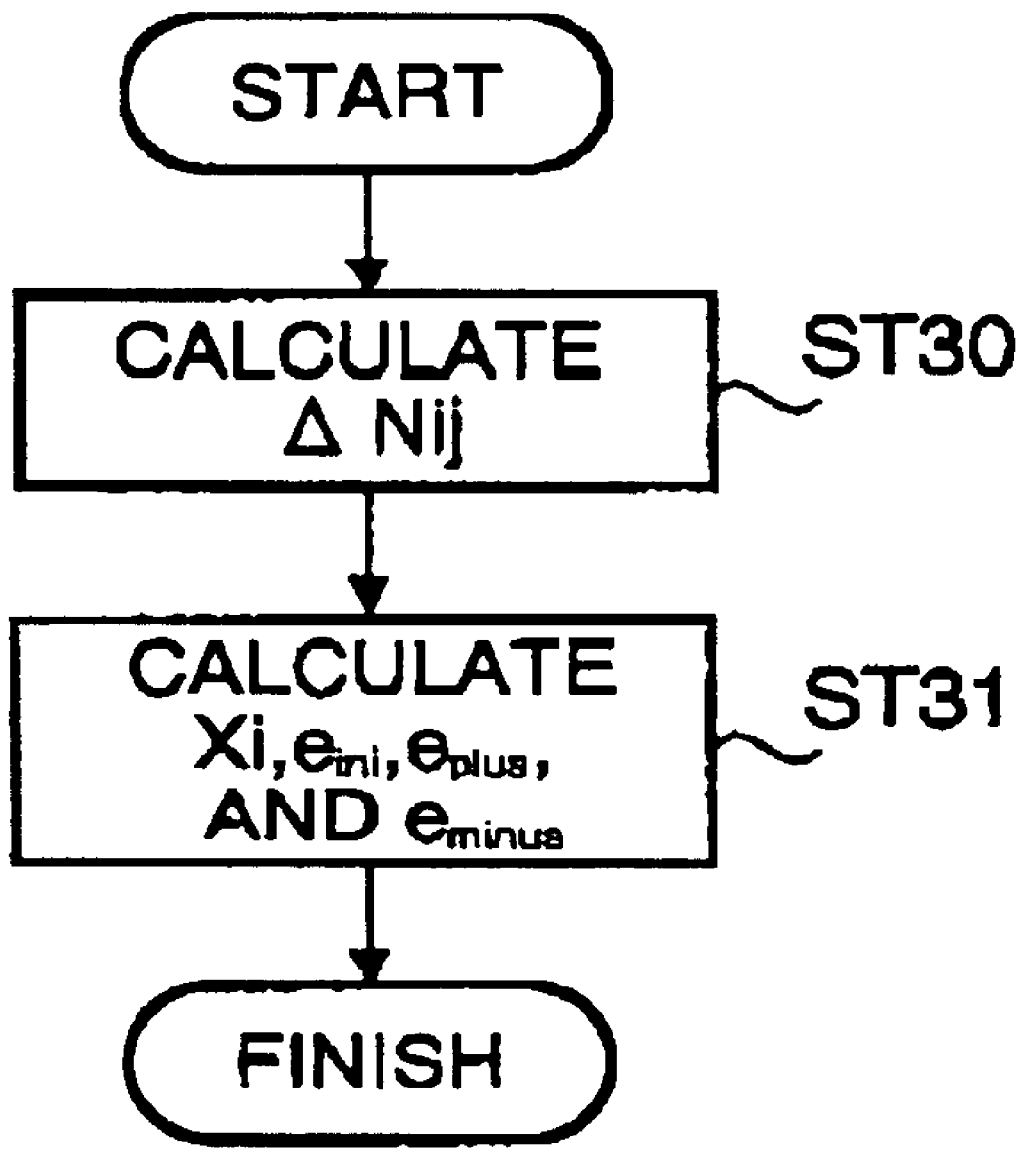
FIG. 12 is a flowchart to explain the operation of the rate matching parameter calculator in the channel codec section in the receiving configuration in the conventional base mobile apparatus.

In addition, the above-mentioned flowcharts are programmed and stored as data in a storage section such as a memory, and a control section not shown calculates the equation (1) according to the program stored in the storage section. The rate matching apparatus is naturally installed in both a mobile station apparatus and a base station apparatus. In a base station apparatus, for example, the rate matching apparatus is installed in each of the channel codec section in the receiving function illustrated in FIG. 5 and of the channel codec section in the transmitting function illustrated in FIG. 7. In a mobile station apparatus, for example, the rate matching apparatus is installed in each of the channel codec section in the receiving function illustrated in FIG. 4 and of the channel codec section in the transmitting function illustrated in FIG. 6.

Further, the calculation method of the fourth embodiment is applicable to an apparatus that performs division and multiplication, as well as the rate matching apparatus, and has the high usability.

① In a rate matching calculation method of the present invention, $1/c^2$ is added to the result of b/a in a calculation process of the following equation (1) for use in obtaining the number of increase or decrease bits on each channel for each frame:

$$Z_{ij} = \left\lfloor \frac{\sum_{m=1}^{i} RM_m^{\|b} \cdot N_{mj}}{\sum_{m=1}^{I} RM_m \cdot N_{mj}} \cdot N_{dataj} \right\rfloor \quad \text{for all } i = 1 \ldots I \quad (1)$$

where RMi: rate matching attribute of TrCH#i

Ni,j: the number of bits per frame on TrCH#i

Ndata,j: the number of bits on CCTrCH

ΔNi,j: the number of increase or decrease bits on TrCH#i.

In the equation (1), the result of b/a is multiplied by c in the equation (1), however, since there is a case that a calculation result is obtained which is smaller than a true division result due to the calculation accuracy in b/a, it sometimes happens that a value smaller than the true value is obtained as the result of the equation (1). In order to prevent such a case from occurring, the correction value is added to the calculation result of b/a. However, if the correction value is excessively large, a value is calculated which is larger than the true value of the equation (1). Then, $1/c^2$ is added in order to prevent the added whole value of the equation (1) from exceeding 1 when c is multiplied. Adding $1/c^2$ to the result of b/a is capable of obtaining a correct calculation result.

The reason for this is that by adding $1/C^2$ to the result of b/a, and then multiplying c by the result that is larger than the division result of b/a, the result becomes larger than the result of the equation (1). In other words, in the equation (1), the Floor calculation is performed at the final step that rounds down to the nearest one, and therefore if an increased value is smaller than 1, the increased value is rounded down.

Therefore, according to the present invention, it is possible to calculate the correct number of bits on both a transmitting side and receiving side.

② A rate matching calculation method of the present invention has the steps of performing correction where $1/c^2$ is added to the result of b/a in a calculation process of the following equation (1) for use in obtaining the number of increase or decrease bits on each channel for each frame:

$$Z_{ij} = \left\lfloor \frac{\sum_{m=1}^{i} RM_m^{\overset{b}{\|}} \cdot N_{mj}}{\sum_{m=1}^{I} RM_m \cdot N_{mj} \overset{\|}{\underset{a}{c}}} \cdot N_{dataj} \right\rfloor \text{ for } alli = 1 \ldots I \quad (1)$$

where RMi: rate matching attribute of TrCH#i

Ni,j: the number of bits per frame on TrCH#i

Ndata,j: the number of bits on CCTrCH

ΔNi,j: the number of increase or decrease bits on TrCH#i, detecting a combination of a, b and c that does not provide a correct calculation result even with the correction performed, obtaining in advance the correct calculation result in the combination detected to store along with the combination, and outputting the correct calculation result stored when a, b and c are input whose combination accords with the combination stored.

According to this method, when a correct solution is not obtained even by using the above-mentioned correction value, the combinations of a, b and c that do not provide correct solutions and the corresponding correct calculation results are pre-examined and already stored. Then, when the calculation is performed in one of the combinations, the storage contents are referred to obtain the correct solution.

③ In a rate matching calculation method of the present invention, in a calculation process of the following equation (1) for use in obtaining the number of increase or decrease bits on each channel for each frame, a calculation of b×c is first performed, and then a result of the calculation is divided by a:

$$Z_{ij} = \left\lfloor \frac{\sum_{m=1}^{i} RM_m^{\overset{b}{\|}} \cdot N_{mj}}{\sum_{m=1}^{I} RM_m \cdot N_{mj} \overset{\|}{\underset{a}{c}}} \cdot N_{dataj} \right\rfloor \text{ for } alli = 1 \ldots I \quad (1)$$

where RMi: rate matching attribute of TrCH#i

Ni,j: the number of bits per frame on TrCH#i

Ndata,j: the number of bits on CCTrCH

ΔNi,j: the number of increase or decrease bits on TrCH#i.

According to this method, a more accurate solution is obtained than a case of multiplying the result of b×a by c.

④ In a rate matching calculation method of the present invention according to above-mentioned rate matching method, when the result of b×c exceeds 32 bits, the value of b×c is divided into upper 28 bits and lower 15 bits, a is subtracted from the upper 28 bits, "1" is set when the subtraction is enabled, while "0" is set when the subtraction is disabled, and after finishing the subtraction once, the upper 28 bits are shifted to the left by 1 bit, α is added to the lowest bit of the lower bits, and this processing is performed repeatedly 17 times.

When the multiplication result of b×c exceeds 32 bits, it is made difficult for the existing 32-bit calculator to achieve the division, due to the 3GPP specification. However, according to this method, the value of b×c is divided into upper 28 bits and lower 15 bits to calculate, whereby it is possible to perform the calculation using the 32-bit calculator.

Further, since it is only required to repeatedly perform 17 times the calculation that is performed while shifting a value of upper 28 bits of b×c by 1 bit, the calculation amount becomes less than a case that the calculation is performed without dividing the value of b×c into upper bits and lower bits. It is thereby possible to shorten the time taken to complete the rate matching.

⑤ A rate matching apparatus of the present invention has a configuration provided with a storage section that stores program data of an equation where $1/c^2$ is added to the result of b/a of the following equation (1) for use in obtaining the number of increase or decrease bits on each channel for each frame:

$$Z_{ij} = \left\lfloor \frac{\sum_{m=1}^{i} RM_m^{\overset{b}{\|}} \cdot N_{mj}}{\sum_{m=1}^{I} RM_m \cdot N_{mj} \overset{\|}{\underset{a}{c}}} \cdot N_{dataj} \right\rfloor \text{ for } alli = 1 \ldots I \quad (1)$$

where RMi: rate matching attribute of TrCH#i

Ni,j: the number of bits per frame on TrCH#i

Ndata,j: the number of bits on CCTrCH

ΔNi,j: the number of increase or decrease bits on TrCH#i, and a calculating section that calculates the number of increase or decrease bits on each channel for each frame according to the program data stored in the storage section.

⑥ A rate matching apparatus of the present invention has a configuration provided with a first storage section that stores program data of an equation where $1/c^2$ is added to the result of b/a of the following equation (1) for use in obtaining the number of increase or decrease bits on each channel for each frame:

$$Z_{ij} = \left\lfloor \frac{\sum_{m=1}^{i} RM_m^{\overset{b}{\|}} \cdot N_{mj}}{\sum_{m=1}^{I} RM_m \cdot N_{mj} \overset{\|}{\underset{a}{c}}} \cdot N_{dataj} \right\rfloor \text{ for } alli = 1 \ldots I \quad (1)$$

where RMi: rate matching attribute of TrCH#i

Ni,j: the number of bits per frame on TrCH#i

Ndata,j: the number of bits on CCTrCH

ΔNi,j: the number of increase or decrease bits on TrCH#i, a calculating section that calculates the number of increase or decrease bits on each channel for each frame according to the program data stored in the first storage section, a second storage, section that stores a combination of a, b and c where a result calculated by the calculating section is not a correct calculation result, and the correct calculation result in the combination, and an outputting section that outputs the correct calculation result stored in the second storage section when a, b and c are input whose combination is stored in the second storage section.

(7) A rate matching apparatus of the present invention has a configuration provided with a storage section that stores program data of an equation where $1/c^2$ is added to the result of b/a of the following equation (1) for use in obtaining the number of increase or decrease bits on each channel for each frame:

$$Z_{ij} = \left\lfloor \frac{\overbrace{\sum_{m=1}^{i} RM_m \cdot N_{mj}}^{b}}{\underbrace{\sum_{m=1}^{I} RM_m \cdot N_{mj}}_{a}} \cdot N_{dataj} \right\rfloor \overset{\|}{c} \quad \text{for all } i = 1 \ldots I \qquad (1)$$

where RMi: rate matching attribute of TrCH#i

Ni,j: the number of bits per frame on TrCH#i

Ndata,j: the number of bits on CCTrCH

ΔNi,j: the number of increase or decrease bits on TrCH#i, and a calculating section which in the equation indicated by the program data stored in the storage section, first calculates b×c, then divides the result of b×c by a, and thereby obtains the number of increase or decrease bits on each channel for each frame.

(8) In the rate matching apparatus of the present invention with the above configuration, in the case where the result of b×c exceeds 32 bits, the calculating section divides a value of b×c into upper 28 bits and lower 15 bits, subtracts a from the upper 28 bits, Sets "1" when the subtraction is enabled, while setting "0" when the subtraction is disabled, shifts the upper 28 bits to the left by 1 bit after finishing the subtraction once, adds a lowest bit of the lower bits to α, and repeatedly performs the subtraction of a and bit shift processing 17 times.

According to the present invention, by using the rate matching apparatus in a base station apparatus or a mobile station apparatus in a mobile communication, it is possible to always calculate the number of bits accurately at the time of transmitting and receiving signals. As a result, the present invention enables excellent communications.

(9) A base station apparatus of the present invention has a configuration provided with any one of the above-mentioned rate matching apparatuses and a transmission/reception apparatus which inputs a frame extracted from a received signal to the rate matching, apparatus at the time of receiving signals, while further inputting a frame to be transmitted to the rate matching apparatus at the time of transmitting signals.

According to the present invention, it is possible to always calculate the number of bits accurately at the time of transmitting and receiving signals, and therefore to perform excellent communications.

(10) A mobile station apparatus of the present invention has a configuration provided with any one of the above-mentioned rate matching apparatuses and a transmission/reception apparatus which inputs a frame extracted from a received signal to the rate matching apparatus at the time of receiving signals, while further inputting a frame to be transmitted to the rate matching apparatus at the time of transmitting signals.

According to the present invention, it is possible to always calculate the number of bits accurately at the time of transmitting and receiving signals, and therefore to perform excellent communications.

As explained above, according to the present invention, it is possible for both a transmitting side and receiving side to always calculate the correct number of bits, and therefore to perform excellent communications.

The present invention is not limited to the above described embodiments, and various variations and modifications may be possible without departing from the scope of the present invention.

This application is based on the Japanese Patent Application No.2000-099510 filed on Mar. 31, 2000, entire content of which is expressly incorporated by reference herein.

What is claimed is:

1. A CDMA transmission data generating method, comprising the steps of:

(a) obtaining a rate-matching parameter $Z_{ij}$ on each channel for each transmission frame by multiplying b with c, and then dividing the result of said multiplying by a, in which a, b, and c are defined by the following equation:

$$Z_{ij} = \left\lfloor \frac{\overbrace{\sum_{m=1}^{i} RM_m \cdot N_{mj}}^{b}}{\underbrace{\sum_{m=1}^{I} RM_m \cdot N_{mj}}_{a}} \cdot N_{dataj} \right\rfloor \overset{\|}{c} \quad \text{for all } i = 1 \ldots I \qquad (1)$$

where:

RMi represents the rate matching attribute of TrCH#i,

Ni,j represent the number of bits per frame on TrCH#I, and

Ndata,j represents the number of bits on CCTrCH; and (b) rate-matching said each channel based on said rate matching parameter $Z_{1j}$.

2. A CDMA transmission data generating method according to claim 1, further comprising the steps of:

multiplexing said each rate-matched channel to generate frame data matching frame length; and interleaving said frame data to generate said transmission frame.

3. A CDMA transmission data generating apparatus, comprising:

(a) a calculation section that obtains a rate-matching parameter $Z_{ij}$ on each channel for each transmission frame by multiplying b with c, and then divides the result of said multiplying by a, in which a, b, and c are defined by the following equation:

$$Z_{ij} = \left\lfloor \frac{\overbrace{\sum_{m=1}^{i} RM_m \cdot N_{mj}}^{b}}{\underbrace{\sum_{m=1}^{I} RM_m \cdot N_{mj}}_{a}} \cdot N_{dataj} \right\rfloor \overset{\|}{c} \quad \text{for all } i = 1 \ldots I \qquad (1)$$

where:

RMi represents the rats matching attribute of TrCH#i,

Ni,j represent the number of bits per frame on TrCH#I, and

Ndata,: represents the number of bits on CCTrCH; and (b) a rate-matching section that rate matches said each channel based on said rate matching parameter $Z_{ij}$.

4. A mobile terminal including a CDMA transmission data generating apparatus according to claim 3.

5. A base station including a CDMA transmission data generating apparatus according to claim 3.

* * * * *